(12) United States Patent
Christenson (10) Patent No.: US 10,907,400 B2
(45) Date of Patent: *Feb. 2, 2021

(54) TELESCOPING AIRCRAFT PANEL DOOR

(71) Applicant: B/E Aerospace, Inc., Winston-Salem, NC (US)

(72) Inventor: Justin C. Christenson, Everett, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/978,705

(22) Filed: May 14, 2018

(65) Prior Publication Data

US 2018/0258686 A1    Sep. 13, 2018

Related U.S. Application Data

(63) Continuation of application No. 15/406,690, filed on Jan. 14, 2017, now Pat. No. 9,976,336, which is a
(Continued)

(51) Int. Cl.
*E05D 15/22* (2006.01)
*E06B 3/50* (2006.01)
(Continued)

(52) U.S. Cl.
CPC .......... *E06B 3/5009* (2013.01); *B64C 1/1423* (2013.01); *B64D 11/00* (2013.01);
(Continued)

(58) Field of Classification Search
CPC .................. B64C 1/1407; E06B 3/5009
(Continued)

(56) References Cited

U.S. PATENT DOCUMENTS

| 178,247 A | 6/1876 | Linscott |
| 704,887 A * | 7/1902 | Low ................. E05F 17/00 49/73.1 |

(Continued)

FOREIGN PATENT DOCUMENTS

| CN | 1245242 A | 2/2000 |
| CN | 201924781 U | 8/2011 |

(Continued)

OTHER PUBLICATIONS

Office Action on EP 15739460.2 dated Sep. 30, 2019. 5 pages.
(Continued)

*Primary Examiner* — Jerry E Redman
(74) *Attorney, Agent, or Firm* — Locke Lord LLP (57) ABSTRACT

In a preferred embodiment, a telescoping panel door for an aircraft compartment includes a first panel configured for hinged connection to a surface of a door frame, a second panel, and a linkage fixing a distance that the second panel can extend from the door frame, where the second panel is configured for connection to the door frame via the linkage. The door operates such that, in a closed position, the second panel is extended from an interior of the first panel, the first and second panels cooperate to completely cover an opening defined by the door frame, and the linkage is generally parallel to the plane defined by the door frame. In an open position, the second panel is retracted into the interior of the first panel by operation of the linkage and the first and second panels are nested to reduce a distanced spanned by the panels.

20 Claims, 11 Drawing Sheets

Related U.S. Application Data continuation-in-part of application No. 15/234,684, filed on Aug. 11, 2016, now Pat. No. 10,099,768, which is a continuation of application No. 14/754,620, filed on Jun. 29, 2015, now Pat. No. 9,440,727.

(60) Provisional application No. 62/023,530, filed on Jul. 11, 2014.

(51) Int. Cl.
| | |
|---|---|
| *B64C 1/14* | (2006.01) |
| *E05F 17/00* | (2006.01) |
| *E05D 15/58* | (2006.01) |
| *B64D 11/00* | (2006.01) |
| *E06B 3/92* | (2006.01) |
| *E06B 5/00* | (2006.01) |

(52) U.S. Cl.
CPC ............ *E05D 15/58* (2013.01); *E05F 17/00* (2013.01); *E06B 3/5045* (2013.01); *E06B 3/921* (2013.01); *E06B 5/00* (2013.01); *E05Y 2800/122* (2013.01)

(58) Field of Classification Search
USPC .................. 49/163, 164, 166, 168, 188, 189
See application file for complete search history.

(56) References Cited

U.S. PATENT DOCUMENTS

| | | | |
|---|---|---|---|
| 787,640 A | 4/1905 | Robinson | |
| 3,029,868 A | 4/1962 | Ogburn | |
| 3,101,777 A | 8/1963 | Sherron | |
| 3,136,538 A * | 6/1964 | Kessner | E05F 15/56 49/117 |
| 3,318,047 A | 5/1967 | Carson | |
| 4,305,227 A * | 12/1981 | Georgelin | E05D 15/48 49/141 |
| D281,575 S | 12/1985 | Chap | |
| 5,242,005 A | 9/1993 | Borgardt | |
| 5,373,979 A | 12/1994 | Moore | |
| 5,392,834 A | 2/1995 | Borgardt | |
| 5,829,725 A | 11/1998 | Russo | |
| 5,832,980 A | 11/1998 | Cianciolo | |
| 6,061,961 A | 5/2000 | Rupe | |
| 6,170,195 B1 | 1/2001 | Lim | |
| 6,422,287 B1 * | 7/2002 | Wilke | E05D 15/58 160/195 |
| 6,823,927 B2 * | 11/2004 | Steel | E05D 3/022 16/49 |
| 7,950,439 B2 * | 5/2011 | Anderson | E05D 15/58 160/195 |
| 8,096,342 B2 | 1/2012 | Scruggs | |
| 8,443,549 B2 * | 5/2013 | Salvietti | E05D 15/48 49/118 |
| 8,925,248 B2 | 1/2015 | Maruyama et al. | |
| 9,057,216 B2 | 6/2015 | Bortoluzzi et al. | |
| 9,228,390 B2 * | 1/2016 | Lee | E06B 7/36 |
| 9,440,727 B2 * | 9/2016 | Christenson | B64D 11/02 |
| 9,637,970 B1 | 5/2017 | Rendon et al. | |
| 9,976,336 B2 * | 5/2018 | Christenson | E06B 5/00 |
| 10,099,768 B2 * | 10/2018 | Christenson | B64D 11/02 |
| 10,280,678 B1 * | 5/2019 | Rendon, Jr. | E06B 3/5072 |
| 10,337,228 B1 * | 7/2019 | Matthews | E06B 3/921 |
| 2006/0197357 A1 | 9/2006 | Catania | |
| 2010/0208433 A1 | 8/2010 | Heimann et al. | |
| 2010/0242366 A1 * | 9/2010 | Liebscher | E05F 15/63 49/142 |
| 2010/0270898 A1 * | 10/2010 | Haab | E05D 15/58 312/323 |
| 2011/0011003 A1 | 1/2011 | Vogel et al. | |
| 2012/0073205 A1 | 3/2012 | Hamaker et al. | |
| 2012/0255230 A1 * | 10/2012 | Smith | E05D 15/48 49/257 |
| 2015/0052835 A1 | 2/2015 | Falter et al. | |
| 2015/0068026 A1 | 3/2015 | Rojo et al. | |
| 2017/0001704 A1 | 1/2017 | Christenson et al. | |

FOREIGN PATENT DOCUMENTS

| | | |
|---|---|---|
| DE | 23 22 907 | 11/1974 |
| DE | 25 02 765 A1 | 7/1976 |
| KR | 101693353 B1 | 1/2017 |
| WO | WO-2008/090447 | 7/2008 |
| WO | WO-2016/007663 A1 | 1/2016 |

OTHER PUBLICATIONS

First Office Action on Chinese Application No. 201580047006.7 dated Oct. 31, 2018.
International Search Report and Written Opinion for International Patent Application No. PCT/US2015/039598, dated Sep. 21, 2015. 9 pages.
International Search Report and Written Opinion on International Patent Application No. PCT/US2018/013328, dated Apr. 30, 2018. 13 pages.
International Search Report for International Patent Application No. PCT/US2015/039598, dated Sep. 21, 2015. 3 pages.
Non-Final Office Action for U.S. Appl. No. 14/754,620, dated Dec. 11, 2015, 5 pages.
Non-Final Office Action for U.S. Appl. No. 15/234,684, dated Aug. 31, 2017, 12 pages.
Non-Final Office Action for U.S. Appl. No. 15/406,690, dated Sep. 1, 2017, 6 pages.
Notice of Allowance for U.S. Appl. No. 15/406,690, dated Jan. 19, 2018, 7 pages.
U.S. Office Action on U.S. Appl. No. 15/234,684 dated Feb. 22, 2018. 8 pages.

* cited by examiner

TELESCOPING AIRCRAFT PANEL DOOR

CROSS REFERENCES TO RELATED APPLICATIONS

This application is a continuation of U.S. patent application Ser. No. 15/406,690, now U.S. Pat. No. 9,976,336, entitled "Telescoping Aircraft Panel Door" and filed Jan. 14, 2017, which is a continuation-in-part of U.S. patent application Ser. No. 15/234,684, now U.S. Pat. No. 10,099,768, entitled "Telescoping Aircraft Panel Door" and filed Aug. 11, 2016, which is a continuation of U.S. application Ser. No. 14/754,620, filed Jun. 29, 2015, now U.S. Pat. No. 9,440,727, which claims priority from U.S. Provisional Application No. 62/023,530, filed Jul. 11, 2014, the contents of each of which are incorporated by reference in their entirety.

BACKGROUND

The present disclosure relates to a panel door for an aircraft. The interior of a commercial aircraft typically includes several compartments, such as crew changing quarters, lavatories, galleys, and the like. In each case, ingress and egress of these compartments are typically through a door or panel that functions as a partition between compartments by walling off the compartment when the door is in a closed position. Doors of this type include both sliding doors and swinging doors. Each of these types of doors have inherent drawbacks. Namely, swinging or hinged doors occupy a large amount of cross-aisle space when the door is open and the design of the aircraft must account for the free space needed to accommodate the arc of the door as it transitions open. Conversely, sliding doors occupy twice the depth space to achieve the same closure area. Both of these shortcomings add unnecessary weight and/or occupy space that could be used for better purposes. Thus, there is a need for an improved door for use in an aircraft that overcomes the shortcomings of the prior art.

SUMMARY OF ILLUSTRATIVE EMBODIMENTS

In one aspect, the present disclosure relates to a two panel door having a first panel hinged to the door frame and a second panel coupled to the frame by a linkage that includes a rotating arm. The rotating arm reduces the arc traveled by the second panel (and thus the door in general) and results in a door with less width, weight, and covers the same area without unduly monopolizing cross-aisle space. The door when opened is roughly half as wide as when it is closed, allowing for a more narrow aisle or, alternatively, leaving more aisle space available for cross traffic. In narrow aisle aircraft, the use of a bi-fold door can be replaced with the implementations described by the present disclosure.

In one aspect, the present disclosure relates to a telescoping panel door for an aircraft compartment, including a first panel configured for hinged connection to a vertical surface of a door frame, a second panel, a linkage fixing a distance that the second panel can extend from the vertical surface of the door frame, where the second panel is configured for connection to a horizontal surface of the door frame via the linkage, and a low resistance telescoping mechanism comprising an engagement structure of the first panel configured for sliding translation with a complementary structure of the second panel. The telescoping panel door, upon installation to the door frame, may operate such that in a closed configuration, a vertical edge of the first panel is adjacent to a vertical edge of the second panel, and in an open configuration, a compartment-facing surface of the first panel is adjacent to an exterior-facing surface of the second panel.

In one aspect, the present disclosure relates to a telescoping panel door for an aircraft compartment including a first panel configured for hinged connection to a first surface of a door frame, a second panel, a first linkage fixing a distance that the second panel can extend from the first surface of the door frame, where the second panel is configured for connection to a second surface of the door frame via the first linkage, and a low resistance telescoping mechanism comprising an engagement structure of the first panel configured for sliding extension and retraction of one of the panels into the other of the panels. The door, upon installation, operates such that in a closed configuration, a vertical edge of the first panel is proximate to a vertical edge of the second panel, and in an open configuration, one panel is enclosed within the hollow portion of the other panel.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

Figure 1:
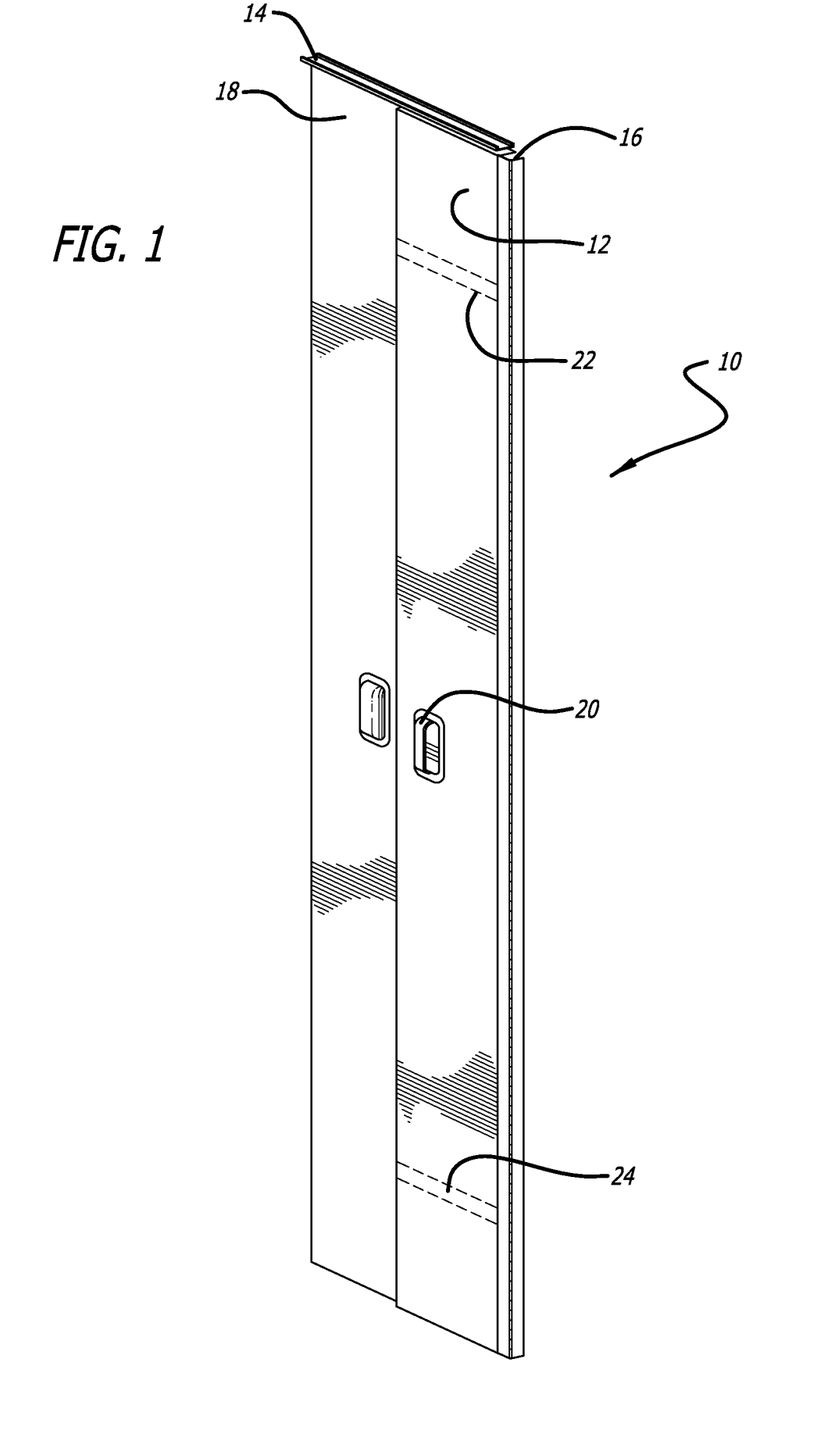
FIG. 1 is an elevated perspective view of an example translating panel door.

Referring now to FIG. 1, a translating door 10 that can be a door in an aircraft, vessel, or other vehicle is disclosed. The translating door 10, in some embodiments, includes at least two panels with a first panel 12 connected to door frame 14 via a hinge or set of hinges, such as the piano hinge 16, and a second panel 18 that is slidingly engaged with the first panel 12 and extends therefrom. The first panel 12 may be attached to the frame 14 in a pivoting arrangement and a width of the first panel 12 can span substantially half of a width of a doorway, such as doorway to an entrance for an aircraft lavatory. A handle or release lever 20 may be provided in the first panel 12 to assist in opening and closing the door 10. The first panel 12 may also be provided with at least one horizontal groove or slot 22, 24 (two, as illustrated), as set forth more fully below. The operation of the first panel 12 is relatively simple, swinging about a fixed point on a hinge or hinges 16 between an open position and a closed position. In the closed position, the first panel 12 is substantially in-line with the doorway. The first panel 12 may occupy approximately one half of a door frame area, and the second panel 18 may also occupy approximately one half of the door frame area.

The second panel 18 of the translating door 10, in some embodiments, is attached to the first panel 12 through a wheel 23 and slot arrangement where the wheels are captured on tracks in the horizontal slots 22, 24 or grooves, such that the second panel 18 is carried by the wheels 24 to move relative to the first panel 12 in a sliding or translating relationship such that the second panel 18 slides along a surface on one side of the first panel 12 as the door 10 is opened or closed. It should be noted that the wheels 23 of the second panel 18, in other embodiments, are replaced with other structures that allow the second panel 18 to glide or extend outward from the first panel 12 without undue friction or resistance, such as drawer slides. If the second panel 18 is sized to be approximately the same width as the first panel 12, when fully extended away from the first panel 12 (in the direction away from the hinged connection on the first panel) the second panel 18 will cooperate with the first panel 12 to completely cover and occlude the door frame 14 in a reliable manner. That is, the first and second panels 12,18 have a combined width that when fully extended fill the doorway when the door 10 is closed by virtue of the full extension of the second panel 18 along and within the horizontal grooves or slots 22,24 of the first panel 12.

To extend and retract the second panel 18 from the first panel 12 as discussed above, the second panel 18, in some implementations, is connected along an upper edge 26 to the door frame 14 by a linkage 28 such as a rigid bar. The linkage 28 may be fixed at a first end 30 to the second panel 18 at an inner edge 32 that is closest to the piano hinge 16, and may be fixed at a second end 34 in a pivoting connection to the door frame 14 at approximately one quarter of a distance between sides of the door frame 14, closest to a side 36 with the hinge that connects to the first panel 12 (See FIGS. 2A-2E). In other implementations, the linkage 28 is replaced by a flexible linkage or spring(s). In further implementations, the linkage 28 is replaced with a retractable chain.

Figure 2A:
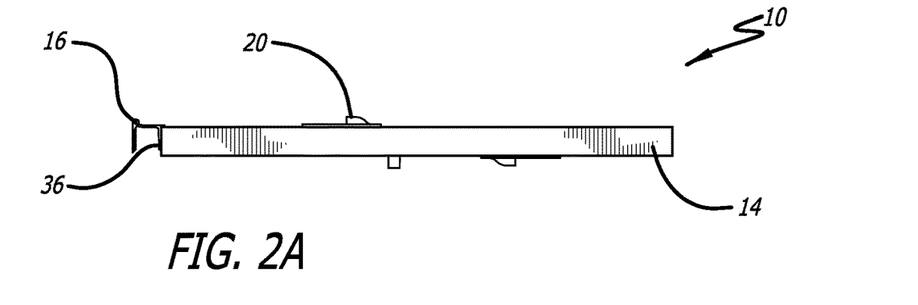
FIG. 2A is a top view of the translating panel door of FIG. 1 in an extended, closed position.
Figure 2B:
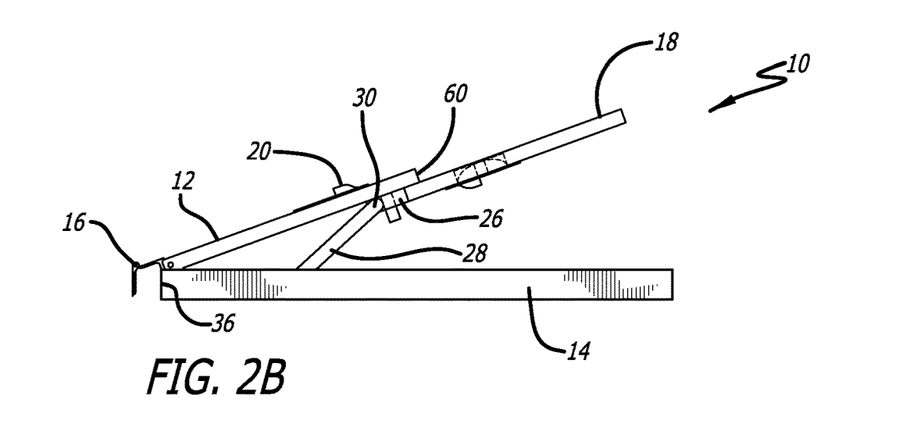
FIG. 2B is a top view of the translating panel door of FIG. 2A in a partially open position.
Figure 2C:
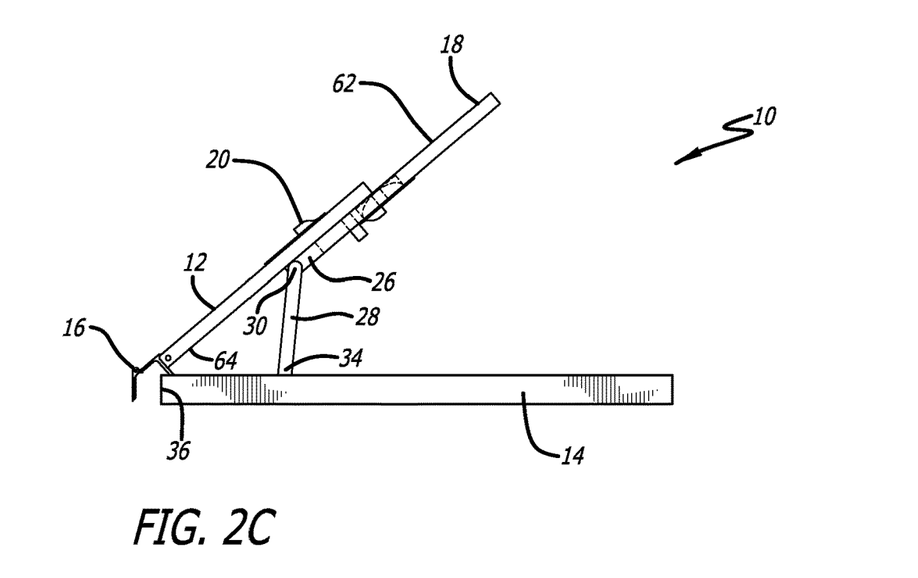
FIG. 2C is a top view of the translating panel door of FIG. 2A approximately halfway open.
Figure 2D:
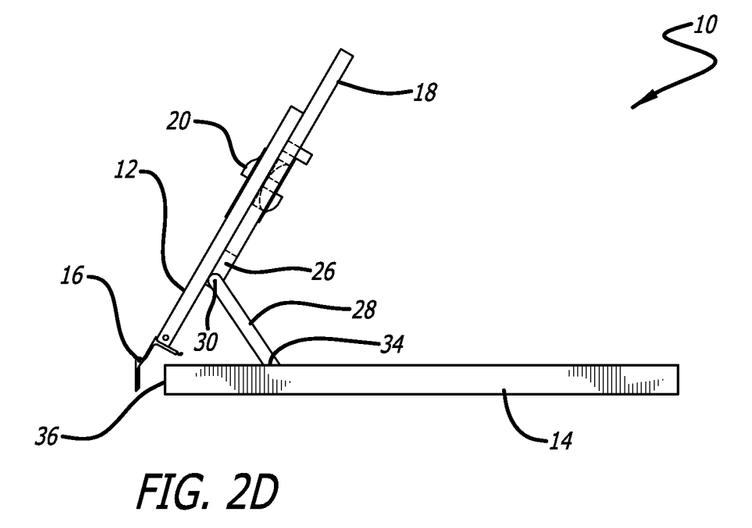
FIG. 2D is a top view of the translating panel door of FIG. 2A in a substantially open position.
Figure 2E:
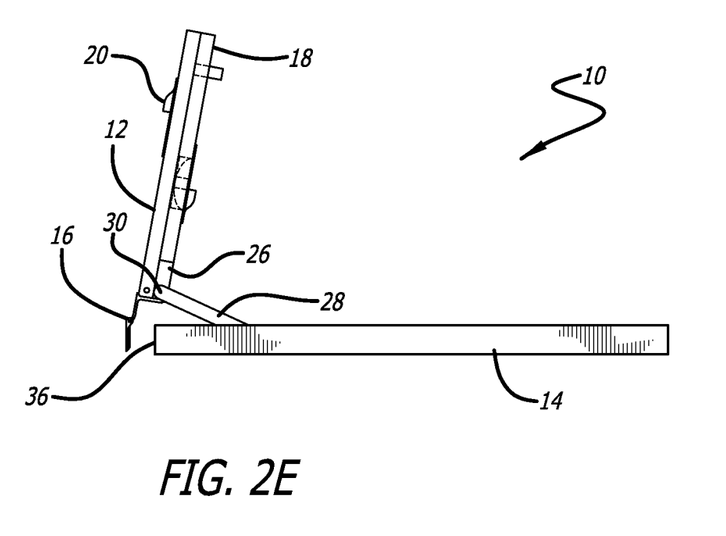
FIG. 2E is a top view of the translating panel door of FIG. 2A in the fully open position.

FIGS. 2A-2E show a sequence of the two panels 12, 18 as the door 10 transitions from fully closed in FIG. 2A to fully open in FIG. 2E. In FIG. 2A, the translating door 10 is fully closed and lies in a plane of the doorway. A depth (or thickness) of the door 10 corresponds to a thickness of a single panel for an entire length of the door 10 except for where the two panels 12, 18 are joined together, creating space on both sides of the door itself. FIG. 2B shows the door 10 as slightly ajar as the door 10 begins to open.

In some embodiments, the first panel 12 is hinged to the door frame 14 at hinge 16 and moves in a predictable arc about the hinged connection. However, the second panel 18 is prevented from following the same arc due to a fixed connection of the inner edge 32 with the door frame via the linkage 28. As a result, the second panel 18 is retracted or constrained along a surface on one side of the first panel 12 within the horizontal grooves or slots 22, 24, and the door "shortens" in length as a result.

In FIG. 2C, the door 10 is approximately halfway open and the second panel 18 is further withdrawn or retracted past the first panel 12 as the door continues to shorten, and an amount of overlap between the first panel 12 and the second panel 18 increases. The fixed connection of the linkage 28 at the second panel 18 pulls the second panel along the first panel 12 such that a combined width (negating overlap) of the first and second panels 12, 18 is effectively halved when the door 10 reaches a fully opened position (FIG. 2E).

In FIG. 2D, the first panel 12 is opened more than halfway, and the second panel 18 has almost completely moved in alignment with the first panel such that a width of the door 10 is significantly reduced. Finally, in FIG. 2E, the linkage 28 has retracted the second panel 18 into complete alignment with the first panel 12 such that a width of the second panel 18 completely overlaps a width of the first panel 12. The width of the door 10 now coincides with the width of the first panel 12 as the second panel 18 is hidden behind the first panel 12. When used as a lavatory door, for example, the translating door 10 of the present disclosure extends only approximately halfway into the lavatory when fully opened as compared with a traditional door, yielding greater mobility and comfort to the occupant without any loss of function.

Figure 3:
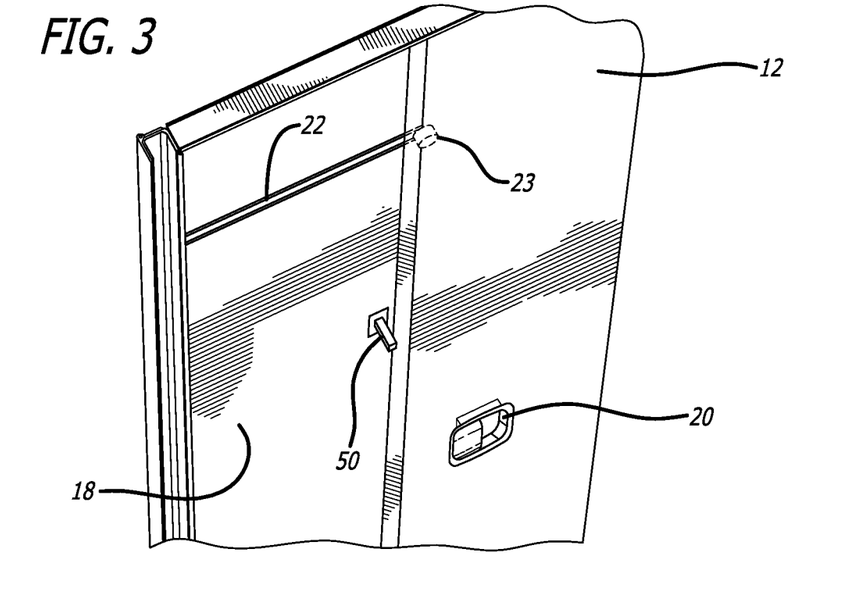
FIG. 3 is an elevated, perspective view of the first and second panels.

FIG. 3 illustrates a perspective view of the first and second panels 12,18 in the closed (extended) position. The horizontal slot 22 in the first panel is shown, and the wheel 23 or other engagement mechanism is shown in shadow that couple the two panels 12,18 together. A pivoting extension 50, such as a coat hook, can be positioned just adjacent an edge of the second panel 18. When the extension 50 is seated inside the first panel 12, the second panel 18 is free to slide back and forth as shown in FIG. 2 as the door 10 transitions from open to closed. In some embodiments, the extension 50 is a lever that can pivot horizontally or vertically as the second panel 18 slides back and forth along a surface on one side of the first panel 12 as the door 10 is opened and closed. However, when the extension 50 is pivoted out of a plane of the first panel 12, the second panel 18 is blocked from sliding across a surface of the first panel 12 by interference of the extension 50. Thus, a reliable and efficient locking mechanism can be formed from the extension 50, which can also function as a dual purpose coat hook or the like.

Figure 4:
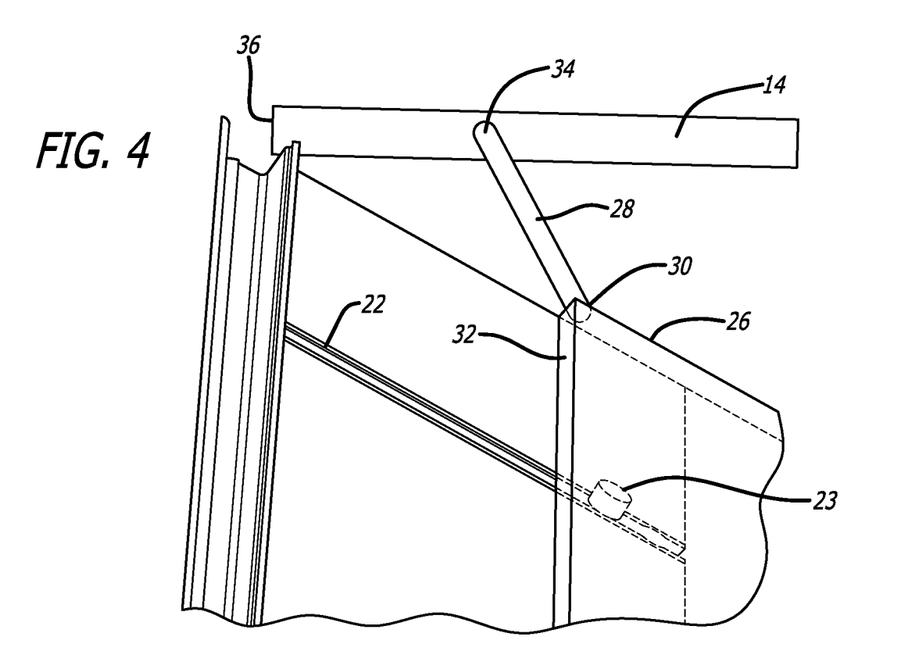
FIG. 4 is a perspective view looking upward at the linkage between the second panel and the door frame.

FIG. 4 illustrates the linkage 28 between the second panel 18 and the door frame 14. The linkage 28 connects the second panel 18 at a top edge 26 with a pin or other mechanical arrangement that allows for rotation of the linkage 28 about the connection so that the linkage 28 can track the second panel 18 as the linkage 28 rotates around the primary hinge 16. The bar, rod, or other structure that forms the linkage 28 is connected to the door frame 14 or an immediate adjacent location by a similar pivoting coupling that allows for the linkage 28 to swivel at the fixed location. As the door 10 opens, the linkage 28 limits the travel of the second panel 18 from the fixed connection point of the bar, thereby causing the second panel 18 to slide along the horizontal grooves 22, 24 from an extended position to a retracted position as the first panel 12 swings in an arc away from the fixed connection point. In this manner, the width of the door 10 automatically shortens to (roughly) half of its extended length when in the fully open position.

The horizontal grooves or slots 22, 24 on the first panel 12 establish tracks or raceways that permit a smooth rolling or sliding motion across their surfaces, so that the second panel 18 can move easily and freely along the first panel. This is particularly important where there is only one linkage 28 maneuvering the second panel 18 at the top 26 of the door 10, because friction or sticking of the track will cause issues with torqueing or twisting of the panels with a resultant loss of effectiveness. In some implementations, the frame 14, linkage 28, and other associated components are associated with an upper door frame, but it can also be understood that the frame 14 and linkage can also be part of a lower door frame or both an upper door frame and a lower door frame.

The result is a two panel door for an aircraft compartment that has a first panel hingedly connected to a door frame, the first panel having a width of approximately half of a door frame to which it is mounted, and a second panel mounted on the first panel for sliding translation thereon, the second panel extending parallel to the first panel in a sliding arrangement. The first panel is coupled to the door frame via a hinge and the second panel is coupled to the door frame via a linkage, the linkage fixing a distance that the second panel can extend from the door frame as the first panel swings about its hinged connection is a circular arc. The two panel door operates such that the ends of the panels 60,32 are adjacent in the closed configuration and the faces 62,64 of the panels 12, 18 are adjacent to each other in the open configuration. In some implementations, the translating door can be used in applications where door strength is an important factor, such as in the case of aircraft lavatory doors.

Figure 5:
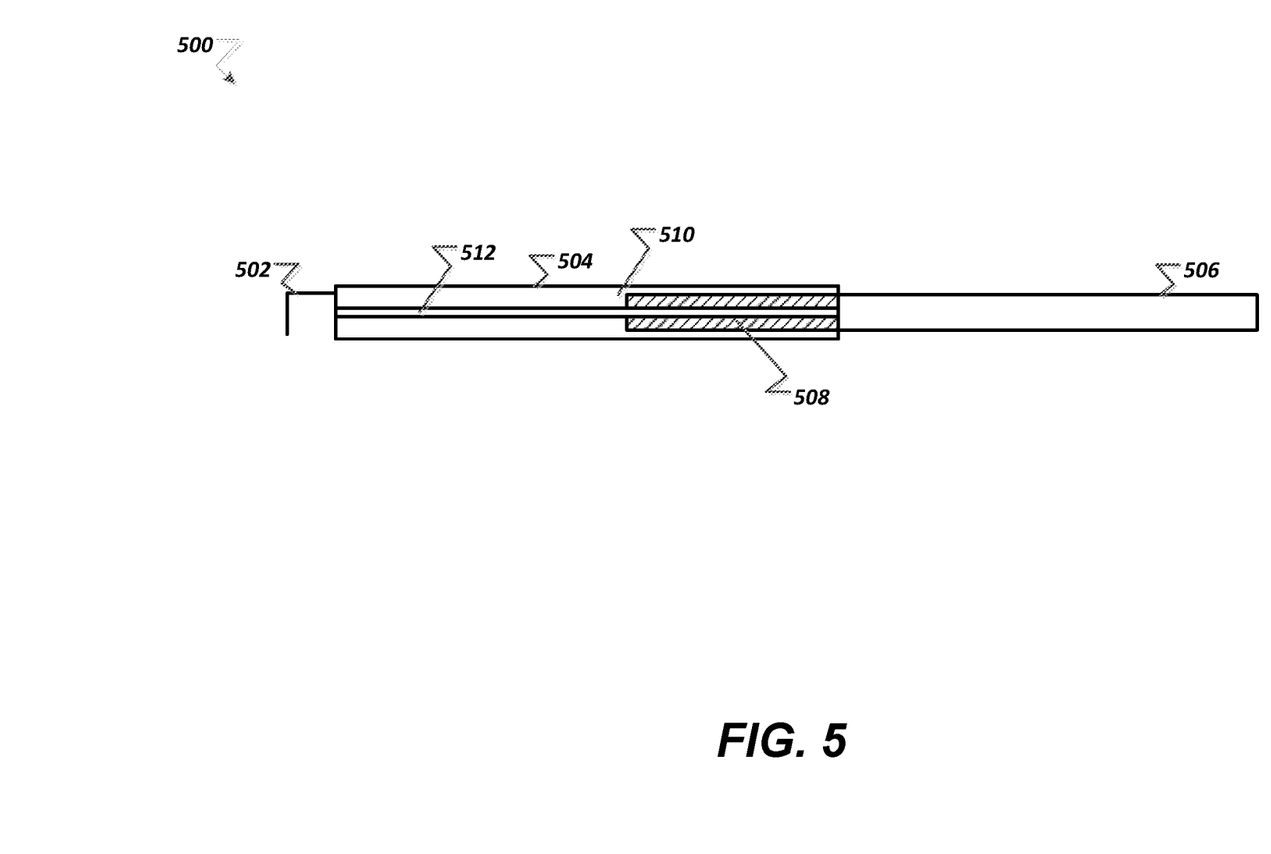
FIG. 5 is a top view of an example telescoping panel door in an extended, closed position.

Turning to FIG. 5, in an illustrative implementation, the aircraft panel door can also be a telescoping door 500 where a second panel 506 slides into and out of a hollow portion 510 of a first panel 504 as the telescoping door 500 is opened and closed. The telescoping door 500 operates in a substantially similar way as the translating door 10 described previously. FIG. 5 provides an illustration of telescoping operations of the door 500 and can also include other components described previously with respect to the translating door 10, such as a door frame, release lever, pivoting extension, etc. In some embodiments, the telescoping door 500 can be used in applications where a thickness of a door aperture is limited, such as in the case of galley doors in an aircraft due to the fact that a thickness of an overlapping portion 508 of the door 500 does not increase as the second panel 506 slides into and out of the cavity 510 of the first panel 504 as the door 500 moves between open and closed positions.

In some implementations, the first panel 504 of the door 500 is connected to a frame (not shown) via a hinge 502 or set of hinges. The hinge 502 can be a piano hinge such as with the hinge 16 described previously or can be a garage hinge or simple pivoting door. In some examples, the door 500 can be vertical swinging or horizontal swinging based on a function and location of the door 500. For example, for a storage compartment in a forward galley of an aircraft, the door 500 may swing vertically, and the hinge 502 is located above or below the first panel 504 between a horizontal surface of the first panel 504 and the door frame when the door 500 is in a closed position. For a trash compartment door that is typically located on an outboard side of an aircraft galley near an exit or service door, the door 500 may swing horizontally, and the hinge 502 is between a vertical surface of the first panel 504 and the door frame on a left side or right side of the first panel 504 based on a direction the door 500 rotates as the door is opened or closed.

The first panel 504 operates by swinging about a fixed point on the hinge 502 between an open position and a closed position. In the closed position, the first panel 504 is substantially in-line with the doorway where the first panel 504 occupies approximately one half of a door frame area, and the second panel 506 also occupies approximately one half of the door frame area.

Just as with the translating door 10, the second panel 506 of the telescoping door 500 can also be attached to the first panel 504 through a guiding mechanism such as a wheel and slot arrangement where the wheels are captured on tracks in the horizontal slots or grooves, such that the second panel 506 is carried by the wheels to move relative to the first panel 504 in a sliding or telescoping relationship such that the second panel 506 slides along one or both inner surfaces of the first panel 504 as the door 500 is opened or closed. In other implementations, the wheels of the second panel 506 can be replaced with other structures that allow the second panel 506 to glide or extend outward or inward within the first panel 504 without undue friction or resistance, such as drawer slides. In some implementations, the second panel 506 slides freely within the hollow portion 510 of the first panel 504 without any type of guiding mechanism.

If the second panel 506 is sized to be approximately the same width as the first panel 504, when fully extended away from the first panel 504 (in the direction away from the hinged connection on the first panel), the second panel 506 cooperates with the first panel 504 to completely cover and occlude the door frame in a reliable manner. That is, the first and second panels 504, 506 have a combined width that when fully extended close the doorway when the door 500 is closed by virtue of the full extension of the second panel 506 from the first panel 504. As the door 500 is moved from a closed position to an open position, the second panel 506 is withdrawn into the hollow portion 510 of the first panel 504, as indicated by the overlapping portion 508. In addition, when the door 500 is in an open position, the width of the second panel 506 is substantially withdrawn into the hollow portion 510 of the first panel 504 so that the second panel 506 is enclosed within the hollow portion 510 of the first panel 504. For example, in the open position, one or more inner surfaces of the first panel 504 are adjacent to one or more exterior surfaces of the second panel 506. In addition, a thickness of the second panel 506 is less than a thickness of the first panel 504 to facilitate the extension and retraction of the second panel 506 within the hollow portion 510 of the first panel 504 so that the second panel 506 can move freely and easily within the hollow portion 510 of the first panel 504.

Figure 6A:
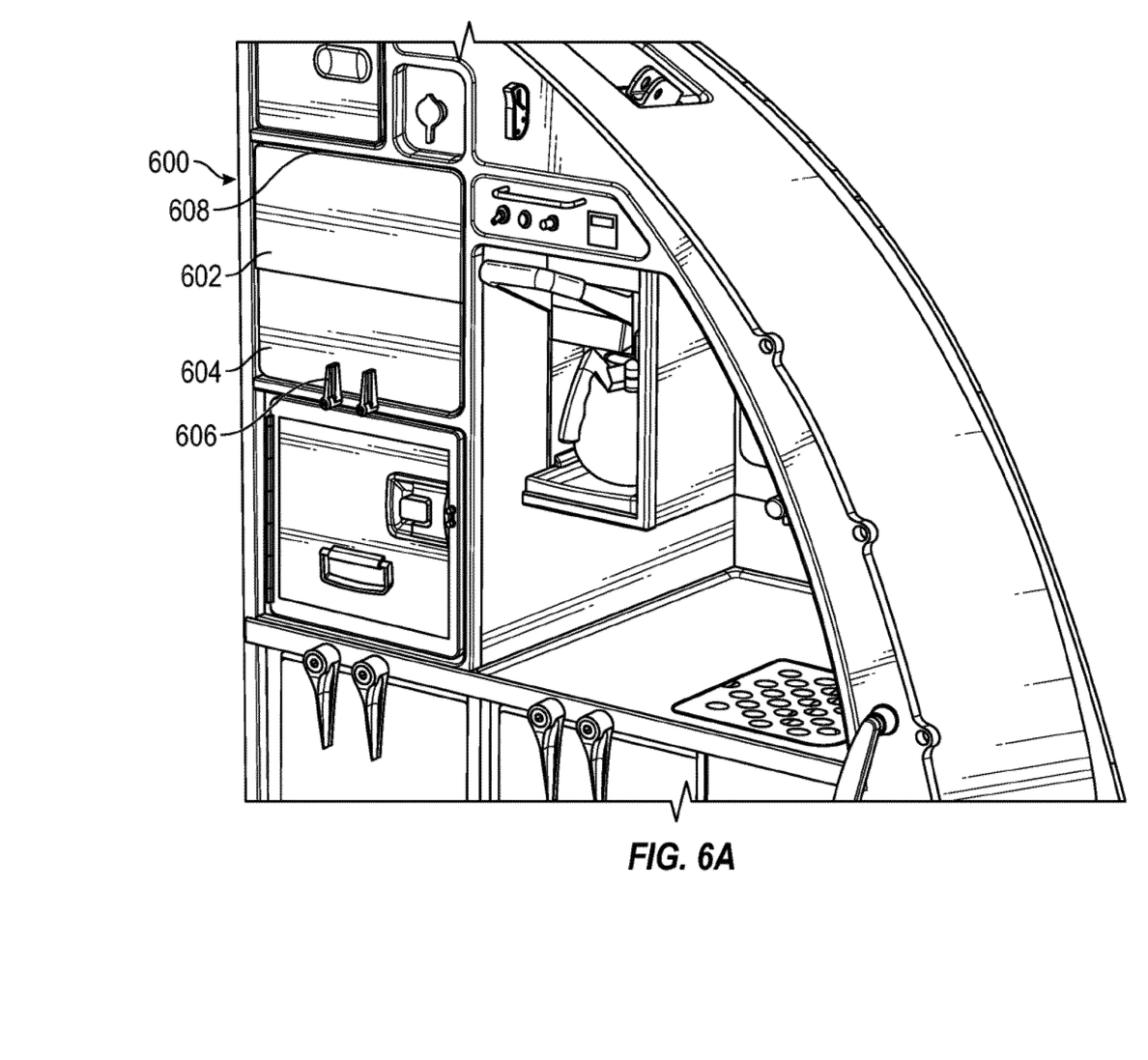
FIG. 6A is a perspective view of an example vertical swinging telescoping panel door in an aircraft galley space in an extended, closed position.
Figure 6B:
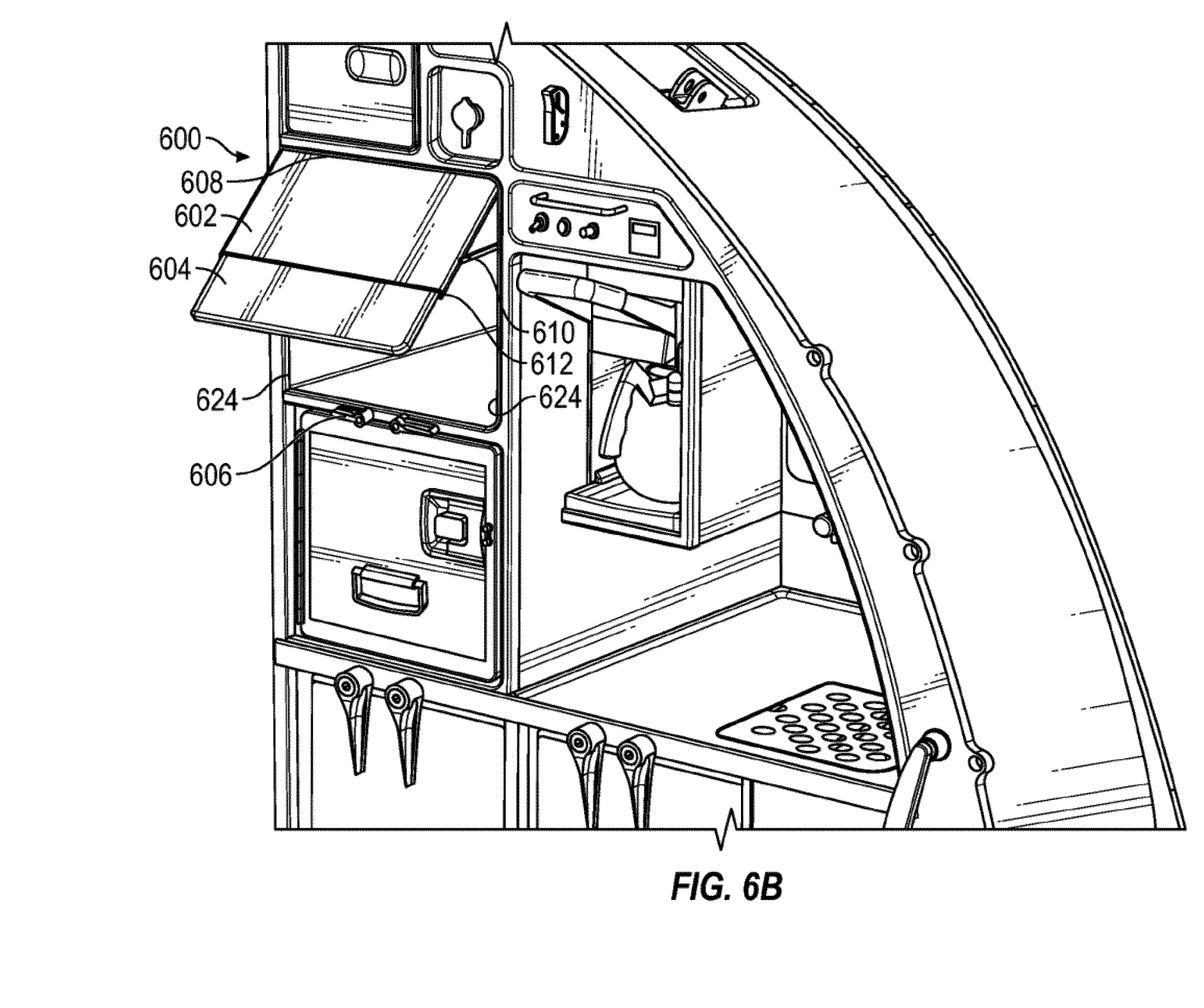
FIG. 6B is a perspective view of the vertical swinging telescoping panel door of FIG. 6A in a halfway open position.
Figure 6C:
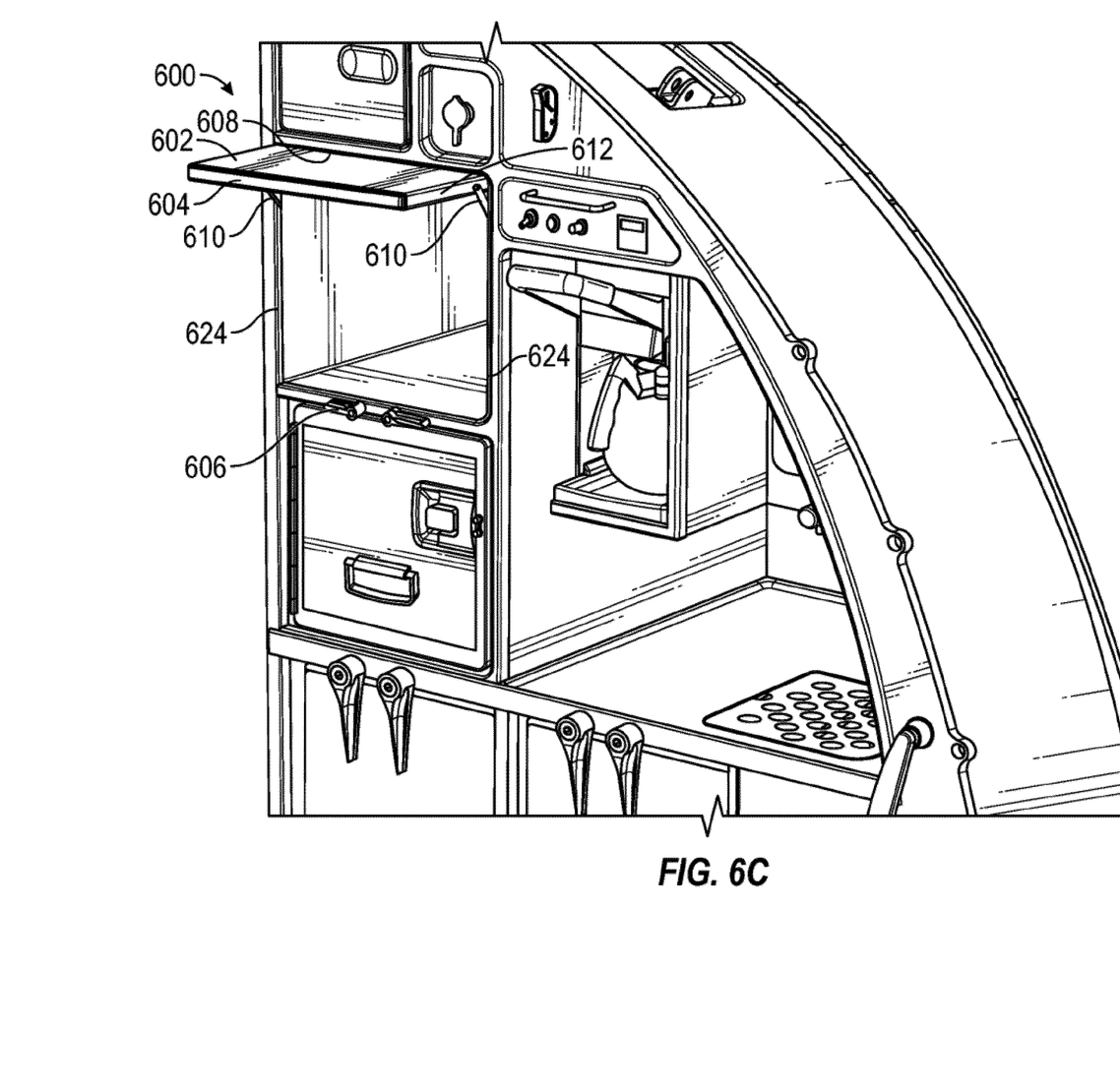
FIG. 6C is a perspective view of the vertical swinging telescoping panel door of FIG. 6A in a fully open position.

Like the translating door 10, to extend and retract the second panel 506 from the first panel 504 of the telescoping door 500 as discussed above, the second panel 506 is connected along an edge to the door frame by at least one linkage such as a rigid bar or control arm (see linkage 610 in FIGS. 6B-6C). In some implementations, the second panel 506 can be connected to the door frame by the linkage on one side or both sides of the second panel 506. The linkage may be fixed at a first end to the second panel 506 at an inner edge that is closest to the hinge 502, and may be fixed at a second end in a pivoting connection to the door frame at approximately one quarter of a distance between sides of the door frame, closest to a side with the hinge that connects to the first panel 506 (see FIGS. 6B-6C and 7B). In some implementations, other types of linkages can also be used, such as retractable chains, springs, or flexible linkages that connect the second panel 506 to the door frame, as discussed above in relation to the second panel 18 of the telescoping door. In some implementations, an edge of the first panel 504 on the same side of the door 500 as the linkage includes a slot 512 or groove that extends across the width of the first panel 504 that allows the linkage to remain in contact with the second panel 506 as the second panel 506 is withdrawn into the hollow portion 510 of the first panel 504 by providing accessibility for the linkage to connect to the second panel 506 when the second panel 506 is within the hollow portion 510 of the first panel 504. In some implementations, the slot 512 and the linkage function as the guiding mechanism that allows the second panel 506 to glide or extend outward or inward within the first panel 504 without undue friction or resistance.

Although described in relation to the second panel 506 being stowed and deployed from the hollow portion 510 of the first panel 504, in alternative embodiments, the second panel may include a hollow portion and be drawn to substantially cover the first panel in the open configuration, and pull away from the first panel to expose the first panel in the closed configuration. In this embodiment, the linkage would work substantially the same.

FIGS. 6A-6C show a sequence of opening a two-panel vertical swinging telescoping door 600 from fully closed in FIG. 6A to fully open in FIG. 6C. The telescoping door 600 covers a compartment in a forward galley of an aircraft and includes a first panel 602 and a second panel 604, which are implementations of the first and second panels 504 and 506 described previously. In FIG. 6A, the telescoping door 600 is fully closed and lies in a plane of the doorway. A depth (or thickness) of the door 600 corresponds to an approximate thickness of a single panel for an entire length of the door 600 except that a thickness of the second panel 604 is slightly less than a thickness of the first panel 602 to facilitate the extension and retraction of the second panel 604 within a hollow portion of the first panel 602 so that the second panel 604 can move freely and easily within the hollow portion of the first panel 602. In addition, the second panel 604 of the door 600 can be secured in the closed position by latches 606 or any other type of locking or latching mechanism.

In some implementations, the first panel 602 retracts completely from the second pane 604 such that an edge of the second panel 604 closest to the first panel 602 aligns with an edge of the first panel 602. The low friction guiding mechanism (e.g., slot and wheel, drawer slide, etc.), for example, may be designed to align the first panel with the second panel. To ensure ease of retraction, in other implementations, the first panel 602 partially overlaps the second panel 604 when in the fully extended position.

In some embodiments, the first panel 602 is hinged to the door frame 624 at hinge 608 and moves in a predictable arc about the hinged connection as the door is opened and closed. However, the second panel 604 is prevented from following the same arc due to a fixed connection of an inner edge with the door frame 624 via the linkage 610. As a result, the second panel 604 is retracted or withdrawn into the first panel 602, and the door 600 "shortens" in length as a result. In addition, the hinge 608 is located above the first panel 602 when the door 600 is in the closed position so that the door 600 swings in vertically upward arc when moving from the closed to the open position. In some examples, an orientation of the vertical swinging door 600 can be reversed such that the hinge 608 is below the first panel 602, and the door 600 swings in a vertically downward arc when moving from the closed to the open position.

In FIG. 6B, the door 600 is approximately halfway open as the second panel 604 is withdrawn or retracted into the first panel 602, and an amount of overlap between the first panel 602 and the second panel 604 increases. A fixed connection of the linkage 610 at the second panel 604 pulls the second panel along the first panel 602 such that a combined width of the first and second panels 602, 604 is effectively halved when the door 600 reaches a fully opened position (FIG. 6C). In addition, an edge of the first panel 602 on the same side of the door 600 as the linkage 610 includes a slot 612 or groove that extends across the width of the first panel 602 which allows the linkage 310 to remain in contact with the second panel 604 as the second panel 604 is withdrawn into the hollow portion of the first panel 602. In some implementations, the slot 612 and the linkage 610 function as the guiding mechanism that allows the second panel 604 to glide or extend outward or inward within the first panel 602 without undue friction or resistance.

In FIG. 6C, the door 600 is in a fully opened position, and the linkage 610 has retracted the second panel 604 into alignment with the first panel 602 such that a width of the second panel 604 is mostly overlapped if not completely overlapped by a width of the first panel 602. The width of the door 600 now coincides with the width of the first panel 602 as the second panel 604 is for the most part hidden within the first panel 602. An edge of the second panel 604, in some embodiments, may be partially exposed (e.g., a portion attached to the linkage 610). When used as a galley compartment door, for example, the telescoping door 600 of the present disclosure extends only approximately halfway into the open galley space when fully opened as compared with a traditional door, yielding greater mobility and comfort to aircraft employees working in an around the galley without any loss of function.

Figure 7A:
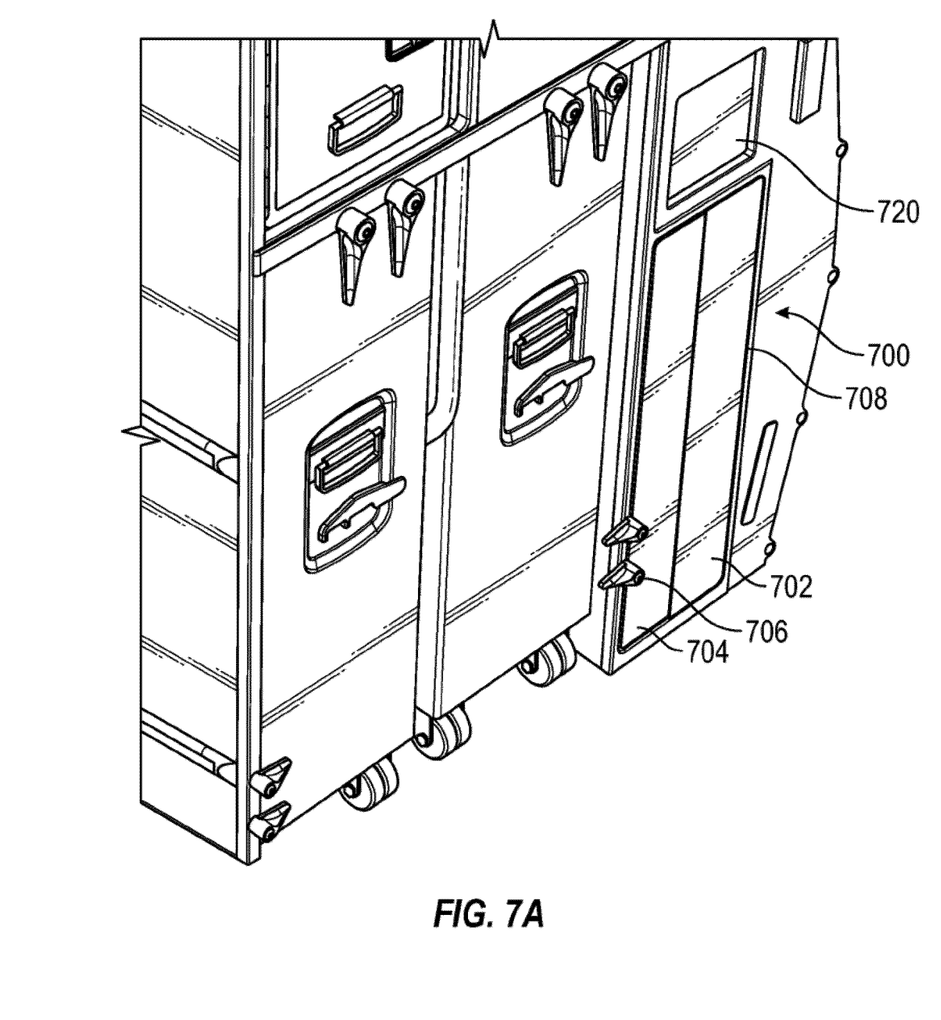
FIG. 7A is a perspective view of an example horizontal swinging telescoping panel door in an aircraft galley space in an extended, closed position.
Figure 7B:
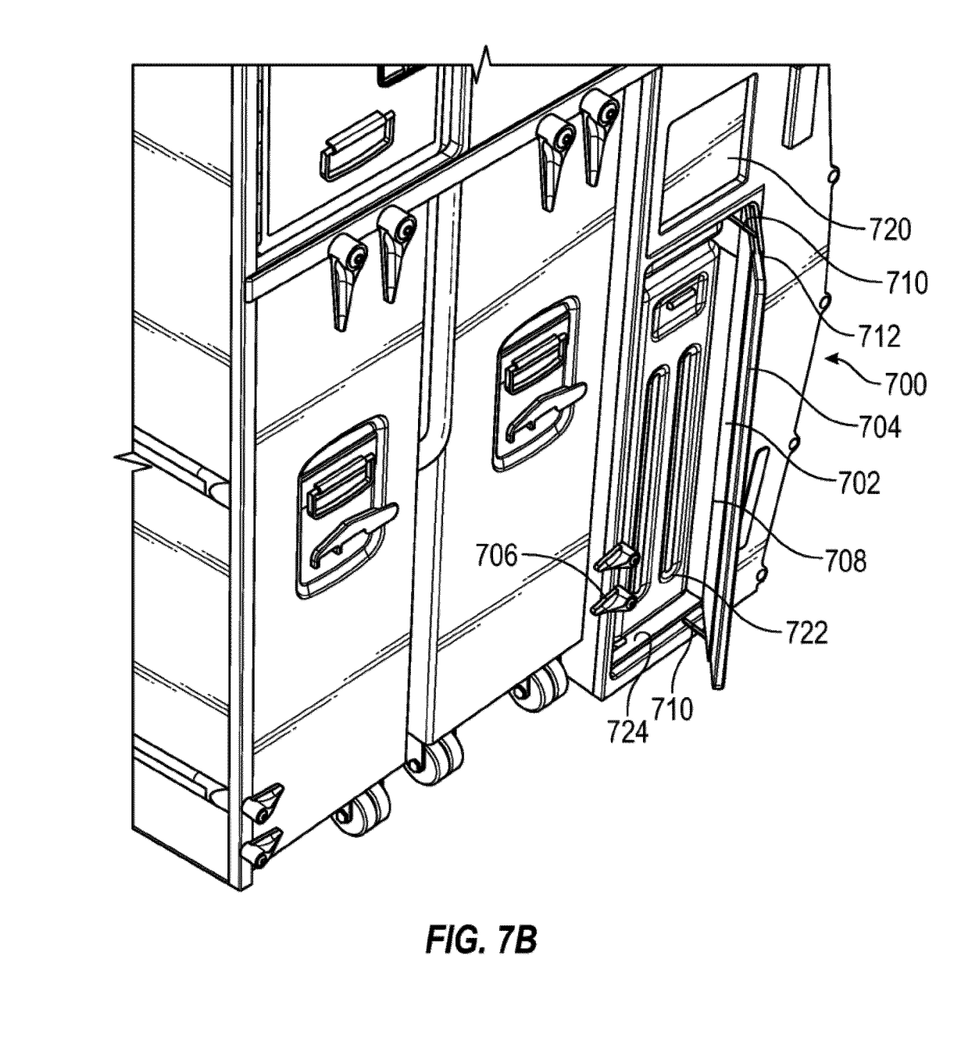
FIG. 7B is a perspective view of an example horizontal swinging telescoping panel door in an aircraft galley space in a halfway open position.
Figure 7C:
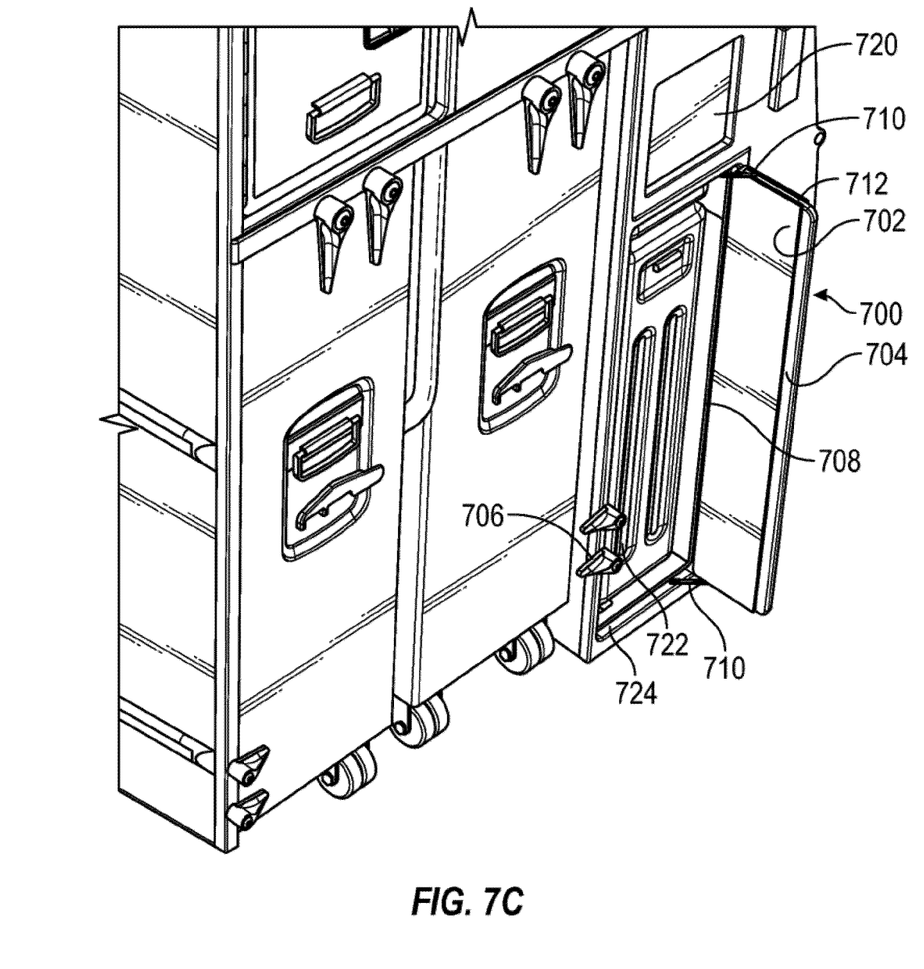
FIG. 7C is a perspective view of the horizontal swinging telescoping panel door of FIG. 7A in a fully open position.

FIGS. 7A-7C show a sequence of opening a two-panel horizontal swinging telescoping door 700 from fully closed in FIG. 7A to fully open in FIG. 7C. The telescoping door 700 covers a trash compartment in a forward galley of an aircraft that houses trash can, which is typically located on an outboard side of the galley in close proximity to an exit or service door. Trash is pushed through waste flap 720, and falls into a trash can 720 housed within a compartment enclosed by the telescoping door 700. The door 700 includes a first panel 702 and a second panel 704, which are implementations of the first and second panels 504 and 506 described previously. In conventional door implementations, when a trash compartment door is opened to empty the trash can 720, the door can interfere with a bustle of the aircraft (not shown). Due to the telescoping action that occurs as the door 700 is opened, the door 700 does not interfere with the bustle.

In FIG. 7A, the telescoping door 700 is fully closed and lies in a plane of a doorway for the trash compartment. A depth (or thickness) of the door 700 corresponds to an approximate thickness of a single panel for an entire length of the door 700 except that a thickness of the second panel 704 is slightly less than a thickness of the first panel 702 to facilitate the extension and retraction of the second panel 704 within a hollow portion of the first panel 702. In addition, the second panel 704 of the door 700 can be secured in the closed position by latches 706 or any other type of locking or latching mechanism.

In some embodiments, the first panel 702 is hinged to the door frame 724 at hinge 708 and moves in a predictable arc about the hinged connection as the door is opened and closed. However, the second panel 704 is prevented from following the same arc due to a fixed connection of an inner edge with the door frame 724 via the linkage 710. As a result, the second panel 704 is retracted or withdrawn into the first panel 702, and the door 700 "shortens" in length as a result. In addition, the hinge 708 is located on one side of the first panel 702 when the door 700 is in the closed position so that the door 700 swings in a horizontal arc when moving from the closed to the open position.

In FIG. 7B, the door 700 is approximately halfway open as the door 700 moves from a closed to an open position, and an amount of overlap between the first panel 702 and the second panel 704 increases. A fixed connection of the linkage 710 at the second panel 704 pulls the second panel along the first panel 702 such that a combined width of the first and second panels 702, 704 is effectively halved when the door 700 reaches a fully opened position (FIG. 7C). In addition, an edge of the first panel 702 on the same side of the door 700 as the linkage 710 can include a slot 712 or groove that extends across the width of the first panel 702 which allows the linkage 710 to remain in contact with the second panel 704 as the second panel 704 is withdrawn into the hollow portion of the first panel 702. In some implementations, the slot 712 and the linkage 710 function as the guiding mechanism which allows the second panel 704 to glide or extend outward or inward within the first panel 702 without undue friction or resistance.

In FIG. 7C, the door 700 is in a fully opened position, and the linkages 710 have retracted the second panel 704 into complete alignment with the first panel 702 such that a width of the second panel 704 is substantially overlapped by a width of the first panel 702. The width of the door 700 now coincides with the width of the first panel 702 as the second panel 704 is hidden within the first panel 702. When used as a trash compartment door, for example, the telescoping door 700 of the present disclosure extends only approximately halfway into the open galley space when fully opened as compared with a traditional door, yielding greater mobility and comfort to aircraft employees working in an around the galley without any loss of function.

The telescoping panel door implementations described herein can also be applied to other types of aircraft doors. For example, implementing the telescoping doors for chilled galley cart compartment doors provide fewer gaps to seal and intrude less into a work area when open. In addition, the vertical swinging telescoping doors can be used to enclose overhead storage bins in order to reduce an amount of projection of the doors into an aisle-way of an aircraft, which allows for better illumination during passenger loading and unloading due to reduced blocking of the overhead lights by the telescoping doors. Also, the telescoping overhead bin doors provide more head clearance for flight crew when the doors are in an open position. A flight deck entry door can also be implemented as a telescoping door. In some embodiments, the forward cabin on an aircraft is a very cramped compartment, and a telescoping flight deck door would provide better functionality and ease of use due to the reduced space intrusion when open while providing more security to the flight deck than a conventional bi-fold door. In addition, a mid-cabin closet door could also be implemented as a telescoping panel door as described previously herein.

The result is a two panel door for an aircraft compartment that has a first panel hingedly connected to a door frame, the first panel having a width of approximately half of a door frame to which it is mounted, and a second panel mounted on the first panel for telescoping therein, the second panel extending parallel to the first panel within a hollow portion of the first panel in a sliding arrangement. The first panel may be coupled to the door frame via a hinge and the second panel may be coupled to the door frame via a linkage, the linkage fixing a distance that the second panel can extend from the door frame as the first panel swings about its hinged connection is a circular arc. In some implementations, the telescoping door can be used in applications where a thickness of a door aperture is limited, such as in the case of galley doors.

In some implementations, the aircraft doors can have a curved shape, such as in the case of the overhead bin doors, and therefore the first panel and second panel also have a curved shape. The translating or telescoping operation of the curved first and second panels function in a substantially similar way to the telescoping or translating operation of the flat, planar-shaped doors described previously herein.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A telescoping panel door for an aircraft compartment, comprising:
 a first panel configured to connect to a door frame, the first panel including an edge including at least one aperture in the edge;
 a second panel configured to extend from and retract within the first panel; and
 at least one linkage attached to the door frame and to the second panel, the at least one linkage attached to the second panel through the at least one aperture;
 wherein
 in a closed operational position, the second panel is extended from an interior of the first panel, and the first and second panels cooperate to cover an opening defined by the door frame, and
 in an open operational position, the second panel is retracted into the interior of the first panel by operation of the at least one linkage and the first and second panels are nested to reduce a distanced spanned by the first panel and second panel.

2. The telescoping panel door of claim 1, further comprising at least one of (1) a slot and a wheel or (2) a drawer slide engaging the first panel to the second panel.

3. The telescoping panel door of claim 1, wherein a thickness of an overlapping portion of the first panel and the second panel does not increase as the second panel extends from and retracts within the first panel.

4. The telescoping panel door of claim 1, wherein, in the open operational position, the second panel is completely retracted into the interior of the first panel.

5. The telescoping panel door of claim 1, wherein, upon installation, a width of the first panel extends one half the width of the door frame.

6. The telescoping panel door of claim 1, wherein the at least one linkage fixes a hinged arc in which the first panel is configured to swing.

7. The telescoping panel door of claim 1, wherein the first panel is configured for hinged connection on a horizontal side of the first panel such that the first panel is configured to swing in a vertical arc.

8. The telescoping panel door of claim 1, wherein the first panel is configured for hinged connection on a vertical side of the first panel such that the first panel is configured to swing in a horizontal arc.

9. The telescoping panel door of claim 1, wherein a thickness of the second panel is less than a thickness of the first panel such that the second panel is configured to slide freely within the interior of the first panel.

10. The telescoping panel door of claim 1, further comprising a latch configured to secure the telescoping panel door in the closed configuration.

11. The telescoping panel door of claim 1, wherein in the closed position, the first panel and second panel each occupy approximately half of an area defined by the door frame.

12. The telescoping panel door of claim 1, further comprising the door frame.

13. The telescoping panel door of claim 1, wherein the at least one linkage includes a fixed length linkage.

14. The telescoping panel door of claim 1, wherein the first panel includes a slot or groove extending across a width of the first panel to allow the linkage to remain in contact with the second panel when the second panel is retracted within the first panel.

15. The telescoping panel door of claim 1, wherein the door frame is an aircraft galley door frame.

16. The telescoping panel door of claim 1, wherein the telescoping panel door covers a trash compartment.

17. A telescoping panel door, comprising:

a first panel configured to connect to a door frame;

a second panel defining an interior, the first panel configured to extend from and retract within the interior; and at least linkage attached to the door frame and to the second panel;

wherein in a closed operational position, the first panel is extended from the interior of the second panel, and the first and second panels cooperate to cover an opening defined by the door frame, and in an open operational position, the first panel is retracted into the interior of the second panel by operation of the linkage and the first and second panels are nested to reduce a distanced spanned by the first panel and second panel.

18. The telescoping panel door of claim 17, wherein the linkage fixes a hinged arc in which the first panel is configured to swing.

19. The telescoping panel door of claim 17, wherein the first panel is configured for hinged connection on a horizontal side of the first panel such that the first panel is configured to swing in a vertical arc.

20. The telescoping panel door of claim 17, wherein the first panel is configured for hinged connection on a vertical side of the first panel such that the first panel is configured to swing in a horizontal arc.

* * * * *